United States Patent
Ji et al.

(10) Patent No.: US 10,081,286 B2
(45) Date of Patent: Sep. 25, 2018

(54) STORAGE CONTAINER

(71) Applicant: DAECHANG CO., LTD., Jeollabuk-do (KR)

(72) Inventors: Jun Dong Ji, Gyeonggi-do (KR); Won Young Chae, Gyeonggi-do (KR)

(73) Assignee: DAECHANG CO., LTD., Jeollabuk-Do (KR)

( * ) Notice: Subject to any disclaimer, the term of this patent is extended or adjusted under 35 U.S.C. 154(b) by 0 days.

(21) Appl. No.: 14/652,122

(22) PCT Filed: Nov. 22, 2013

(86) PCT No.: PCT/KR2013/010694
§ 371 (c)(1),
(2) Date: Jun. 14, 2015

(87) PCT Pub. No.: WO2015/026009
PCT Pub. Date: Feb. 26, 2015

(65) Prior Publication Data
US 2016/0167556 A1   Jun. 16, 2016

(30) Foreign Application Priority Data
Aug. 22, 2013 (KR) .......................... 10-2013-0099671

(51) Int. Cl.
*B60N 3/10* (2006.01)
*B65D 81/18* (2006.01)
(Continued)

(52) U.S. Cl.
CPC ............ *B60N 3/104* (2013.01); *A47G 23/02* (2013.01); *B60N 3/10* (2013.01); *B60N 3/108* (2013.01);
(Continued)

(58) Field of Classification Search
CPC ....................................................... B60N 3/104
(Continued)

(56) References Cited

U.S. PATENT DOCUMENTS 4,355,518 A * 10/1982 Beitner .................... B63J 2/12
62/240
4,627,242 A * 12/1986 Beitner .................. F25B 21/02
62/3.6

(Continued)

FOREIGN PATENT DOCUMENTS

DE   102008009866 A1 *  9/2009  ............ B60N 3/101
JP   H08-156671 A    6/1996
(Continued)

OTHER PUBLICATIONS

International Search Report for PCT/KR2013/010694.

*Primary Examiner* — Scott McNurlen
(74) *Attorney, Agent, or Firm* — The PL Law Group, PLLC

(57) ABSTRACT

A storage container is disclosed. A storage container according to one embodiment of the present invention comprises: at least one accommodation portion for accommodating goods; and a contact portion formed at the inner lateral surface of the accommodation portion and transferring heat to the goods by making contact with the inner lateral surface of the goods, wherein the inner lateral surface of the accommodation portion is formed in any one of a non-circular shape, a combined shape of a circle and a non-circle, a combined shape of circles having different radii of curvature, a combined shape of a non-circle and a non-circle, a combined shape of a circle or a non-circle and a polygon, a combined shape of a circle or a non-circle and a plane, a combined shape of different shapes of polygons, and a polygonal shape.

8 Claims, 15 Drawing Sheets

(51) Int. Cl.
*F25B 21/04* (2006.01)
*A47G 23/02* (2006.01)
*B60R 7/04* (2006.01)

(52) U.S. Cl.
CPC .............. *B60R 7/04* (2013.01); *B65D 81/18* (2013.01); *F25B 21/04* (2013.01); *F25B 2321/023* (2013.01)

(58) Field of Classification Search
USPC .......................................... 62/3.61; 224/544
See application file for complete search history.

(56) References Cited

U.S. PATENT DOCUMENTS

| | | | | |
|---|---|---|---|---|
| 4,757,928 A | * | 7/1988 | Browne | B60N 3/103 224/275 |
| 6,141,969 A | * | 11/2000 | Launchbury | A47J 36/2483 165/80.1 |
| 6,155,063 A | * | 12/2000 | Felde | A47J 31/005 296/37.12 |
| 6,422,300 B1 | * | 7/2002 | Wylin | B60H 1/00271 165/41 |
| 7,089,749 B1 | * | 8/2006 | Schafer | B60H 1/00264 62/3.2 |
| 2003/0150972 A1 | * | 8/2003 | Murray | B60R 7/14 248/682 |
| 2006/0138814 A1 | * | 6/2006 | Burbrink | B60N 3/101 297/188.14 |
| 2009/0288800 A1 | * | 11/2009 | Kang | B60N 2/4686 165/42 |
| 2011/0297715 A1 | * | 12/2011 | Kamiya | B60N 3/101 224/539 |
| 2014/0042199 A1 | * | 2/2014 | Gregory, Jr. | B60R 7/02 224/401 |

FOREIGN PATENT DOCUMENTS

| | | |
|---|---|---|
| JP | 2005-254854 A | 9/2005 |
| JP | 2011-111073 A | 6/2011 |
| KR | 20-1997-0032364 U | 7/1997 |
| KR | 10-2005-0027552 A | 3/2005 |

* cited by examiner

STORAGE CONTAINER

TECHNICAL FIELD

The present invention relates to a storage container, and more particularly, to a storage container which improves the heat transfer efficiency.

BACKGROUND ART

In general, a storage container has a space for accommodating articles (e.g., foods, beverages, etc.) therein. In case where the storage container is a cup holder, since cans or drinks etc. are mainly formed in a cylindrical shape, the cup holder is formed in a cylindrical shape as well.

FIG. 1 is a plan view schematically illustrating a conventional cup holder. Referring to FIG. 1, the conventional cup holder 50 is formed in a circular shape, when viewed from above. When the cup holder 50 accommodates a can or a drink of a cylindrical shape, the side of the can or the drink gets in a line contact with the inner surface of the cup holder 50. In other words, in order for the can or the drink to be easily inserted into the cup holder 50, the cup holder 50 is formed in a circular shape having a larger diameter than that of the can or the drink. In this case, when the can or the drink is inserted into the cup holder 50, the side of the can or the drink gets in a line contact with the inner surface of the cup holder 50.

As described above, in case of forming the cup holder 50 in a circle shape, the side of the can or the drink may make only one line contact with the inner surface of the cup holder 50, which results in deteriorating the heat transfer efficiency from the cup holder 50 to the can or the drink. For example, in case where a thermoelectric element is formed in the holder cup for cooling or heating the cup holder 50, only one line contact between the cup holder 50 and the can or the drink is made, and thereby the heat transfer efficiency from the cup holder 50 to the can or the drink deteriorates.

Meanwhile, the storage container is usually manufactured in a shape in a way that the side of the storage container is perpendicular to the bottom surface of the storage container. Conventionally, such a shape of storage container was manufactured, for example, by an injection molding method or a pressing method. However, in case where the storage container is manufactured in a shape in a way that the side of the storage container is perpendicular to the bottom surface of the storage container, a take-out gradient needed to be applied to a mold in order to easily take out the storage container from the mold after completing the injection molding process or the pressing process.

In other words, as shown in FIG. 2, in case where a storage container 20 is manufactured in a shape in a way that the side of the storage container 20 is perpendicular to the bottom surface of the storage container 20, a take-out gradient ($\theta$) needed to be applied to the side of a mold 10 in order to easily take out the storage container 20 from the mold 10. In order to explain the concept of the take-out gradient ($\theta$), the angle of the take-out gradient ($\theta$) is shown to be slightly exaggerated. However, in general the angle of the take-out gradient ($\theta$) corresponds to 1~2°.

As such, the storage container 20 manufactured by applying the take-out gradient ($\theta$) has an inclination corresponding to the angle of the take-out gradient ($\theta$) in the side thereof, and thus in practice, the side and the bottom surface of the storage container 20 are not capable of making an exact right angle. Consequently, when the beverage can or the water bottle, etc. is accommodated in the storage container 20, the beverage can or the water bottle is not capable of getting in a close contact with the side of the storage container 20 and is spaced apart from each other at a distance.

Then, since the beverage can or the water bottle substantially gets in contact with the bottom surface of the storage container 20 only, even though the storage container 20 is cooled or heated using a thermoelectric element, the heat transfer efficiency deteriorates from the storage container 20 to the beverage can or the water bottle. In other words, since in the conventional storage container 20, the heat transfer is made only through the bottom surface of the storage container 20, there is a problem that the heat transfer efficiency from the storage container 20 to the article deteriorates.

SUMMARY

In view of above, the embodiment of the present invention provides a storage container which is capable of improving the heat transfer efficiency.

In accordance with an embodiment of the present invention, a storage container includes at least one accommodating compartment for accommodating an article, and a contact portion which is formed in the inner surface of the accommodating compartment and gets in contact with the side of the article to make a heat transfer to the article. The inner surface of the accommodating compartment is formed in any one of a non-circular shape, a shape of combination of a circular shape and a non-circular shape, a shape of combination of circular shapes having different radii of curvatures, a shape of combination of a non-circular shape and a non-circular shape, a shape of combination of a circular or non-circular shape and a polygonal shape, a shape of combination of a circular or non-circular shape and a flat shape, a shape of combination of a polygonal shape and a different polygonal shape, and a polygonal shape.

The contact portion may be formed in two or more in the inner surface of the accommodating compartment and may get in a line contact or a surface contact with the side of the article.

The inner surface of the accommodating compartment may be formed in a flat surface or a curved surface at the contact portion and a portion adjacent to the contact portion.

The contact portion may be formed by protruding inwardly so as to get in contact with the article in the inner surface of the accommodating compartment.

The storage container in accordance with another embodiment of the present invention includes at least one accommodating compartment having an inner surface that is formed in any one of a non-circular shape, a shape of combination of a circular shape and a non-circular shape, a shape of combination of circular shapes having different radii of curvatures, a shape of combination of a non-circular shape and a non-circular shape, a shape of combination of a circular or non-circular shape and a polygonal shape, a shape of combination of a circular or non-circular shape and a flat shape, a shape of combination of a polygonal shape and a different polygonal shape, and a polygonal shape, and a contact portion which is formed in the inner surface of the accommodating compartment and gets in contact with the side of the article to provide a heat transfer to the article. A bottom surface of the accommodating compartment is formed so as to be perpendicular to the contact portion.

The contact portion may be formed to be inclined by applying a take-out gradient, and the bottom surface of the accommodating compartment may be connected to the bottom of the contact portion and may be formed to be inclined by the angle of the take-out gradient, and may make a right angle with respect to the contact portion.

The storage container may further include a pressurizing member which makes the other side of the article pressurized in the inner surface of accommodating compartment so as for the article to get in a close contact with the inner surface of the accommodating compartment, and a pressurizing member inserting recess which is formed at the accommodating compartment and in which the pressurizing member is housed and fixed.

The storage container may further include at least one thermal conductive protrusion which is formed on the outer surface or the inner surface of the storage container.

The storage container may further include a thermoelectric element of which one side is formed in the storage container, and a heat radiator which is formed at the other side of the thermoelectric element.

The storage container may further include a fixing rib of which one side is connected to the accommodating compartment, and a coupling member which couples the heat radiator and the other side of the fixing rib each other.

The storage container may further include a heat shield member which is formed at the coupling member and blocks thermally the heat radiator and the fixing rib.

At least either the contact portion or the bottom surface of the accommodating compartment may be made of a thermal conductive material, and the other portion other than the contact portion and the bottom surface of the accommodating compartment may be made of a non-thermal conductive material.

The storage container may further include a secondary heat transfer member which is formed at the contact portion and a portion adjacent to the contact portion.

The storage container may be formed by coupling the side and the bottom surface of the accommodating compartment each other and have a leak-proof member that is formed between the side and the bottom surface of the accommodating compartment.

The accommodating compartment may be formed in a way that at least a portion or all the portion of any one of the contact portion and the bottom surface of the accommodating compartment is made of a heat pipe.

The storage container may further include a hot wire which is formed in the accommodating compartment.

The storage container may be installed in a vehicle where the storage container is capable of receiving a chilly air or a hot air from the air conditioning system of the vehicle via a duct or a heat pipe connected to the air conditioning system of the vehicle.

A storage container in accordance with further another embodiment of the present invention includes an accommodating compartment which accommodates an article and has an area having a first radius of curvature and an area having a second radius of curvature larger than the first radius of curvature, and at least two or more contact portions in which each of the area having the first radius of curvature and the area having the second radius of curvature gets in contact with the article in accordance with the radius of curvature of the article.

A storage container in accordance with still another embodiment of the present invention includes an accommodating compartment which accommodates an article, the accommodating compartment including an inner surface that is formed in any one of a non-circular shape, a shape of combination of a circular shape and a non-circular shape, a shape of combination of circular shapes having different radii of curvatures, a shape of combination of a non-circular shape and a non-circular shape and a shape of combination of a circular or a non-circular shape and a flat shape, and at least one corner portion which is formed so as to accommodate the article having a rectangular shape in the accommodating compartment.

A storage container in accordance with still further another embodiment of the present invention includes an accommodating compartment which accommodates an article and has an inner surface that is formed in a circular shape or a non-circular shape, and at least one corner portion which is formed so as to accommodate the article having a rectangular shape in the accommodating compartment.

A storage container in accordance with stiller further another embodiment of the present invention includes at least one accommodating compartment which is formed in a shape of seating recess on one side of the storage container so as for the article to be placed safely, wherein the seating recess is formed in any one of a shape of combination of at least two or more areas having different radii of curvatures, a shape of combination of an area having a predetermined radius of curvature and at least one flat surface, and a shape of combination of at least two or more different flat surfaces.

The side of the article may be placed safely on the seating recess, and the bottom surface of the article may get in contact with the other side of the storage container.

A storage container in accordance with stiller further another embodiment of the present invention includes an accommodating compartment of a rectangular shape for accommodating an article, wherein the article may be accommodated in one corner portion of the accommodating compartment and gets in contact with the accommodating compartment.

The side of the accommodating compartment forming the one corner of the accommodating compartment may be formed to be inclined by applying a take-out gradient, and the bottom surface of the accommodating compartment may be connected to the bottom of the side of the accommodating compartment and formed to be inclined by an angle of the take-out gradient to make a right angle with respect to the side of the accommodating compartment.

The storage container may further include a thermoelectric element of which one side is formed at the storage container, and a heat radiator which is formed at the other side of the thermoelectric element.

In accordance with an embodiment of the invention, the inner surface of the accommodating compartment of the storage container is formed in any shape of a non-circular shape, a shape of combination of a circular shape and a non-circular shape, a shape of combination of circular shapes having different radii of curvatures, a shape of combination of a non-circular shape and a non-circular shape, a shape of combination of a circular or non-circular shape and a polygonal shape, a shape of combination of a circular or non-circular shape and a flat shape, a shape of combination of a polygonal shape and a different polygonal shape, and a polygonal shape. Therefore, even if the article is of a cylindrical shape, the article is capable of making at least two contacts with the inner surface of the accommodating compartment, and thereby the heat transfer efficiency from the accommodating compartment to the article can be improved. Also, the inner surface of the accommodating compartment is formed to be inclined by applying the take-out gradient, and the bottom surface of the accommodating compartment is formed to be inclined by an angle of the take-out gradient to make a right angle with respect to the inner surface of the accommodating compartment. Accordingly, the inner surface and the bottom surface of the accommodating compartment make a right angle each other, and thereby the article is capable of getting in actual line contact in the inner surface of the accommodating compartment to which the take-out gradient is previously applied.

DETAILED DESCRIPTION

Hereinafter, a specific embodiment of a storage container of the present invention will be described in reference to FIGS. 3 through 15. However, this is merely an exemplary embodiment and the present invention is not limited thereto.

In the following description, well-known functions and/or constitutions will not be described in detail if they would unnecessarily obscure the features of the invention. Further, the terms to be described below are defined in consideration of their functions in the embodiments of the invention and may vary depending on a user's or operator's intention or practice. Accordingly, the definition may be made on a basis of the content throughout the specification.

The technical spirit of the present invention is determined by the claims, and the following embodiments are just means for describing effectively the progressive technical spirit of the present invention to those skilled in the art within the scope of the present invention.

Figure 1:
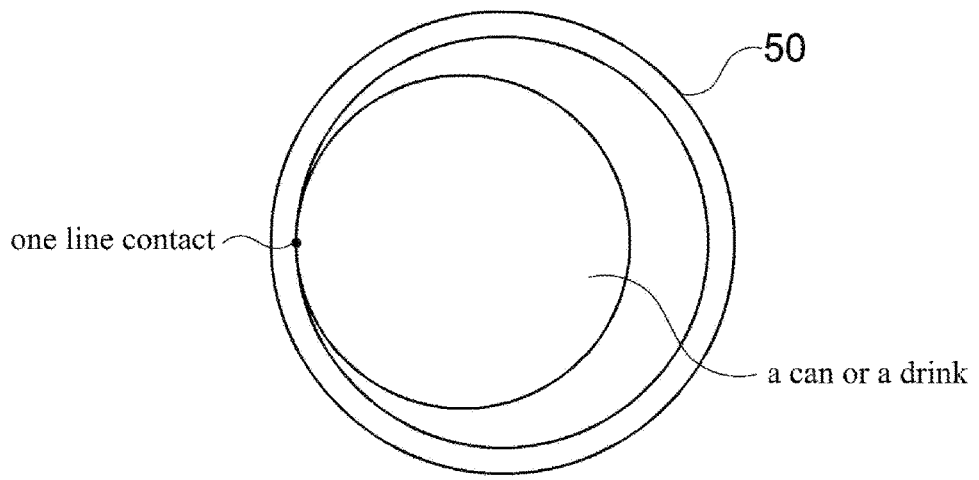
FIG. 1 is a plan view schematically illustrating a conventional cup holder
Figure 2:
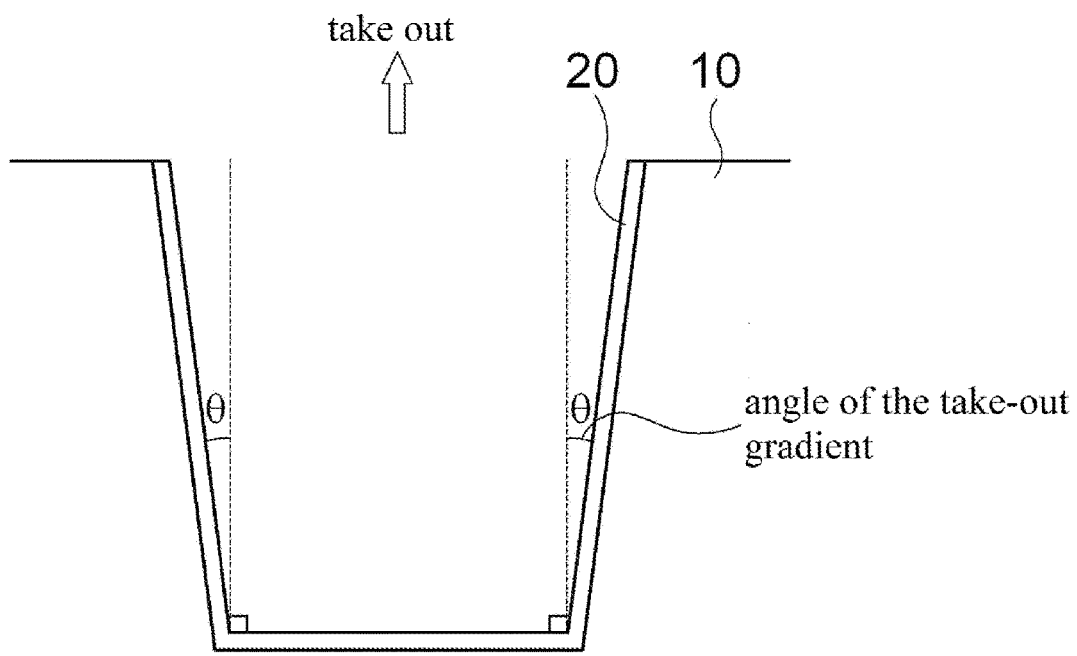
FIG. 2 is a view illustrating a state in which a take-out gradient is applied to a side of a storage container.
Figure 3:
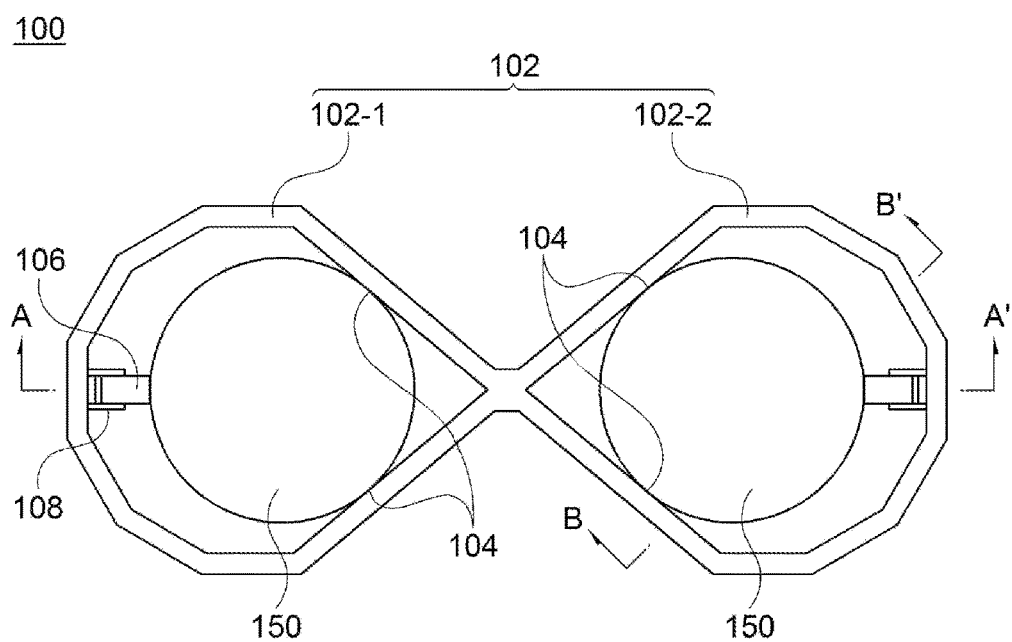
FIG. 3 is a plan view illustrating a storage container in accordance with a first embodiment of the present invention.
Figure 4:
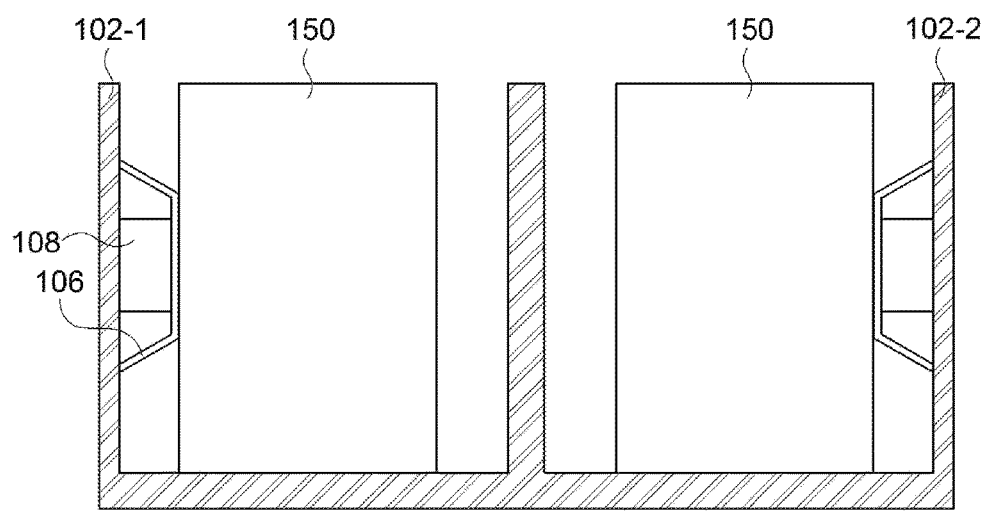
FIG. 4 is a cross sectional view taken along the line IV-IV" in FIG. 3.
Figure 5:
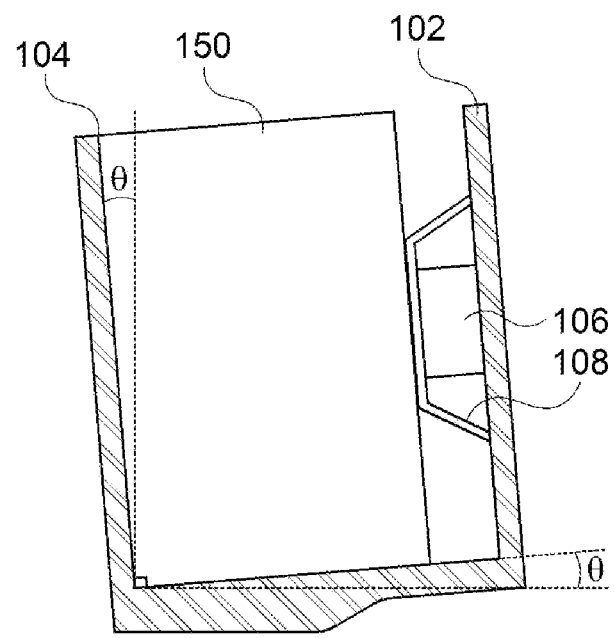
FIG. 5 is a cross sectional view taken along the line V-V' in FIG. 3.

FIG. 3 is a plan view illustrating a storage container in accordance with a first embodiment of the present invention; FIG. 4 is a cross sectional view taken along the line IV-IV' in FIG. 3; and FIG. 5 is a cross sectional view taken along the line V-V' in FIG. 3. In this embodiment, it will be described based on the case that the storage container is a cup holder, but is not limited thereto, and may be applied to various kinds of storage containers as well.

Referring to FIGS. 3 through 5, a storage container 100 includes an accommodating compartment 102, contact portions 104 and pressurizing members 106.

The accommodating compartment 102 accommodates articles 150. An article 150, for example, may be a can or a drink, but is not limited thereto. At least one accommodating compartment 102 may be formed at the storage container 100. For example, the accommodating compartment 102 may include a first accommodating compartment 102-1 and a second accommodating compartment 102-2. In this description, the accommodating compartment 102 is shown to have two accommodating compartments, which however is not limited thereto, and may be formed of a various numbers other than two.

The contact portions 104 are portions that are formed at the inner surface of the accommodating compartment 102 and get in contact with the side of the article 150. At least two or more contact portions 104 may be formed at the inner surface of the accommodating compartment 102. In order to form at least two or more contact portions 104 on the inner surface of the accommodating compartment 102, the inner surface of the accommodating compartment 102 may be formed in different shapes other than a non-circular shape. In this regard, the inner surface of the accommodating compartment 102 may be formed in any shape of a non-circular shape, a shape of combination of a circular shape and a non-circular shape, a shape of combination of circular shapes having different radii of curvatures, a shape of combination of a non-circular shape and a non-circular shape, a shape of combination of a circular or non-circular shape and a polygonal shape, a shape of combination of a circular or non-circular shape and a flat shape, a shape of combination of a polygonal shape and a different polygonal shape, and a polygonal shape. The shape of the inner surface of the accommodating compartment 102 is shown as viewed from above.

Each of the contact portions 104 may make a line contact or a surface contact with the side of the article 150 in accordance with the shape of the inner surface of the accommodating compartment 102 in which the contact portion 104 is formed. For example, in case where the contact portion 104 makes a line contact with the side of the article 150, the contact portion 104 and a portion adjacent to the contact portion 104 may be formed in a flat shape. In case where the contact portion 104 makes a surface contact with the side of the article 150, the contact portion 104 and a portion adjacent to the contact portion 104 may be formed in a curved shape corresponding to the side of the article 150.

Meanwhile, as shown in FIG. 5, the bottom surface of the accommodating compartment 102 may be formed to be perpendicular to the inner surface of the accommodating compartment 102. In this case, a portion of the side of the accommodating compartment 102 may be formed to be inclined by applying a take-out gradient. Also, the bottom surface of the accommodating compartment 102 may be formed to be inclined upwardly by an angle of the take-out gradient (θ) so as to be perpendicular to the portion of the side of the accommodating compartment 102. In other words, when the take-out gradient is applied to the side of the accommodating compartment 102, even in case where the side and the bottom surface of the accommodating compartment 102 are to be manufactured in a right angle each other, the side and the bottom surface of the accommodating compartment 102 may not be an exact right angle. Accordingly, in an embodiment of the present invention, the bottom surface of the accommodating compartment 102 is formed to be inclined by the angle of the take-out gradient based on the information of the angle of the take-out gradient. In this case, by applying the take-out gradient to the inner surface of the accommodating compartment 102, not only the storage container 100 may be easily taken out from a mold during manufacturing the storage container 100, but also the inner surface and the bottom surface of the accommodating compartment 102 may be formed vertically. Therefore, the article 150 may get in contact with the portion of the side and the bottom surface of the accommodating compartment 102 at the same time to provide a heat transfer through the portions of the side and the bottom surface of the accommodating compartment at the same time. In this regard, the inner surface of the accommodating compartment 102 which is formed to be inclined by applying the take-out gradient may be the contact portion 104. Consequently, the side of the article 150 gets in an actual line contact with the contact portion 104, and thereby the heat transfer efficiency can be further improved.

Figure 6:
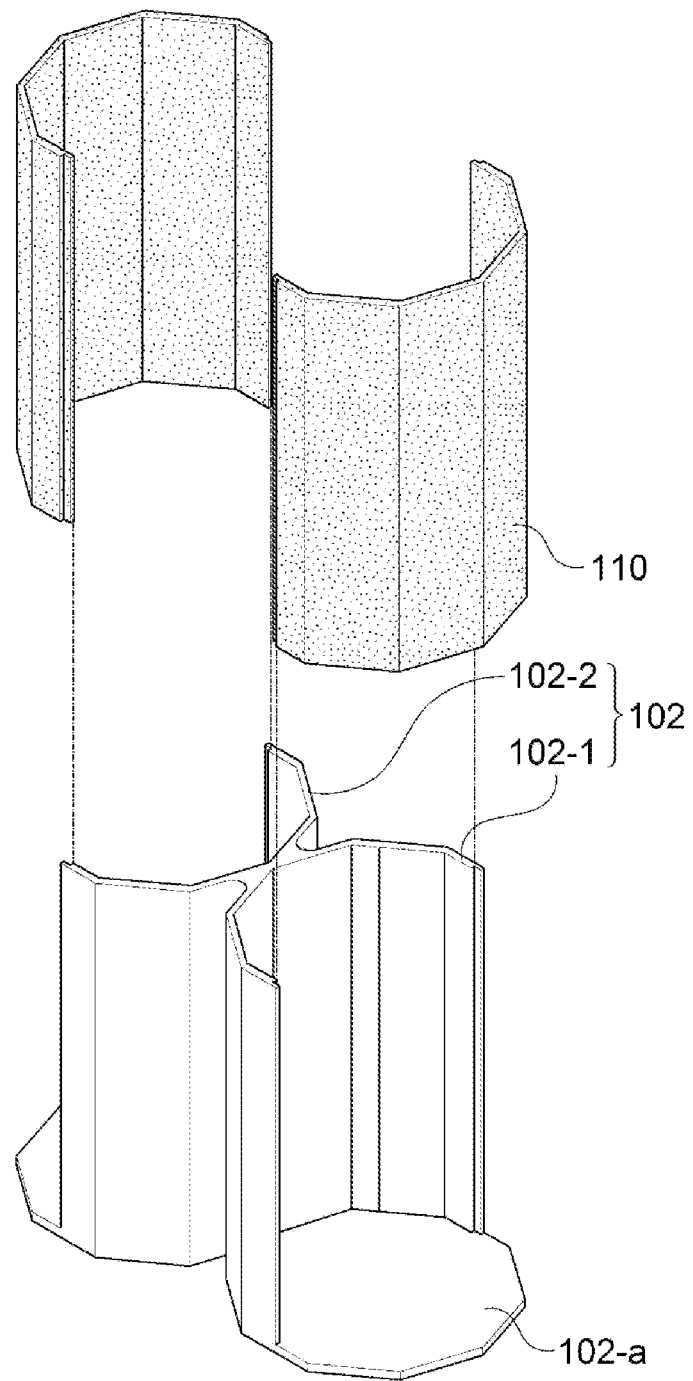
FIG. 6 is a view illustrating a state in which a container support member is coupled to a portion which is cut off and removed in an accommodating compartment, in a storage container in accordance with a first embodiment of the present invention.

In order to make the inner surface (e.g., the contact portion 104) and the bottom surface of the accommodating compartment 102 to be perpendicular each other without a deformation of the accommodating compartment 102, a portion of the other side of the accommodating compartment 102 other than the contact portion 104 needed to be cut off and removed. As shown in FIG. 6, a container support member 110 may be coupled to the cut off and removed portion of the accommodating compartment 102 to retain the shape of the accommodating compartment 102 as it is. In other words, the container support member 110 may be formed in a shape corresponding to the cut off and removed portion of the side of the accommodating compartment 102. In this case, a portion other than the contact portion 104 in the accommodating compartment 102 may be formed so as to be perpendicular to the bottom surface of the accommodating compartment 102. The container support member 110 may be coupled by sliding to the accommodating compartment 102, but a coupling method of the container support member 110 to the accommodating compartment 102 is not limited thereto. The contact portion 104 (also inclusive of a portion adjacent to the contact portion 104, in case where the contact portion 104 makes a line contact, l) of the accommodating compartment 102 and the bottom surface 102-a of the accommodating compartment 102 may be formed of a thermal conductive material (e.g., aluminum, copper, magnesium, tungsten, etc.), and a portion (e.g., the container support member 110) other than the contact portion 104 of the accommodating compartment 102 and the bottom surface of the accommodating compartment 102 may be formed of a non-thermal conductive material.

Figure 7:
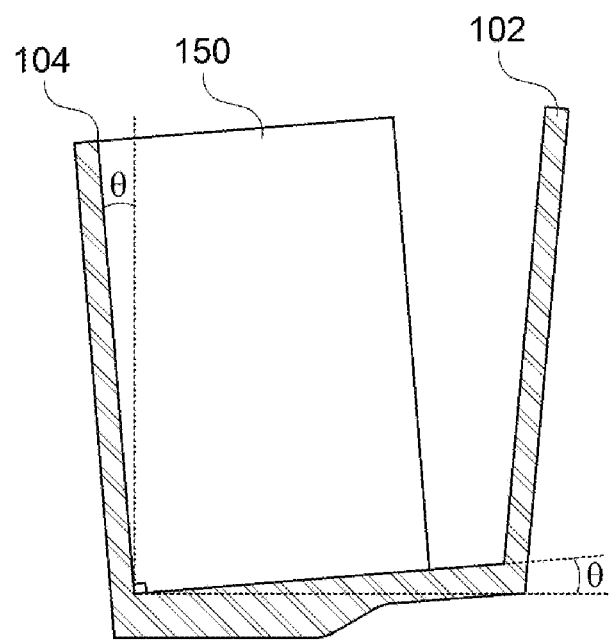
FIG. 7 is a view illustrating a state in which a take-out gradient is applied to a side of a storage container, in a storage container in accordance with a first embodiment of the present invention.

Meanwhile, it has been described that in order to form the contact portion 104 and the bottom surface in a right angle, the container support member 110 is coupled to the portion which is formed by cutting off and removing a portion of the other side of the accommodating compartment 102 other than the contact portion 104, which however is not limited thereto, and the whole accommodating compartment 102 may be formed in one piece. In this case, as shown in FIG. 7, the other side of the accommodating compartment 102 other than the contact portion 104 forming a right angle to the bottom surface 102-a is formed to be inclined with respect to the bottom surface 102-a so as for the storage container 100 to be taken out easily from a mold (not shown) during manufacturing. In FIG. 7, for the sake of convenience of the description, the pressurizing member 106 and the pressurizing member fixing portion 108 are omitted.

As described above, only a portion of the accommodating compartment 102 with which the article 150 gets in actual contact is formed of a thermal conductive material, and thereby the heat loss which may occur during heat transferring from the accommodating compartment 102 to the article 150 may be minimized. However, the present invention is not limited thereto, and any one of the contact portion 104 and the bottom surface 102-a of the accommodating compartment 102 may be formed of a thermal conductive material. Also, a portion of the accommodating compartment 102 which does not get an actual contact with the article 150 is formed of a non-thermal conductive material such as a resin, and thereby a manufacturing cost of the storage container 100 may be reduced.

Portions (e.g., the contact portion 104 and the bottom surface of the accommodating compartment 102) which get in contact with the article 150 in the accommodating compartment 102 may be formed of a heat pipe partly or wholly. With this configuration, it is possible to further improve the heat transfer efficiency from the accommodating compartment 102 to the article 150.

In addition, in the portions (e.g., the contact portion 104 and the bottom surface of the accommodating compartment 102) of the accommodating compartment 102 with which the article 150 gets in contact, a secondary heat transfer member (not shown) may be formed. For example, in case where the bottom surface 102-a of the contact portion 104 (in case where the contact portion 104 makes a line contact, a portion adjacent to the contact portion 104 is included as well) and the accommodating compartment 102 is formed of a thermal conductive material, the second heat transfer member (not shown) may be formed at the contact portion 104 and the bottom surface 102-1 of the accommodating compartment 102. The second heat transfer member (not shown) may be, for example, a thermal conductive pad, a metal thin film, a heat pipe etc., but is not limited thereto.

On the other hand, the side of the accommodating compartment 102 and the bottom surface 102-a of the accommodating compartment 102 may be formed separately and then coupled each other. In this case, a leak-proof member (not shown) may be formed between the side and the bottom surface 102-a of the accommodating compartment 102. The leak-proof member (not shown) may be formed of, for example, a sealing material. Further, a plurality of thermoelectric protrusion (not shown) may be formed at at least one of the inner surface and the outer surface of the accommodating compartment 102.

The pressurizing member 106 may be formed at the accommodating compartment 102. The pressurizing member 106 pressurizes the article 150 on the other side of the article 150 so as for the side of the article 150 to get in close contact with the contact portion 104 in the accommodating compartment 102. In this case, even if the storage container 100 is shaken, the article 150 can sustain a fixed state, and also the article 150 can be maintained a close contact with the contact portion 104, and thereby the heat transfer efficiency may be improved. The pressurizing member 106 may be formed of, for example, an elastic material. Thanks to such the pressurizing member 106, when the article 150 is accommodated inside the accommodating compartment 102, the pressurizing member 106 becomes to pressurize the other side of the article 150 while being retracted. On both sides of the pressurizing member 106, pressurizing member fixing portions 108 may be formed to fix the pressurizing member 106 in the inner surface of the accommodating compartment 102.

FIGS. 8A through 8E are views schematically illustrating various shapes of an inner surface of an accommodating compartment, in a storage container in accordance with a first embodiment of the present invention.

Figure 8A:
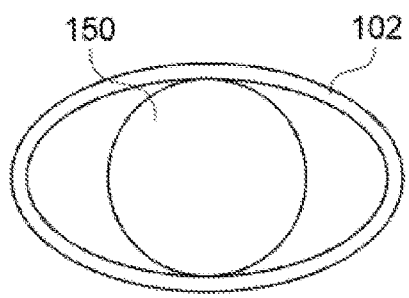
FIGS. 8A through 8E are views schematically illustrating various shapes of an inner surface of an accommodating compartment, in a storage container in accordance with a first embodiment of the present invention.
Figure 8B:
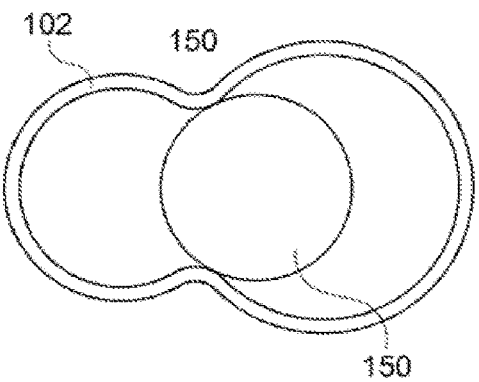
Figure 8C:
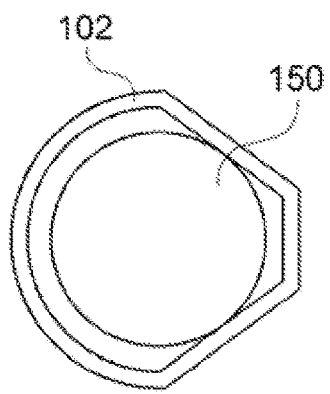
Figure 8D:
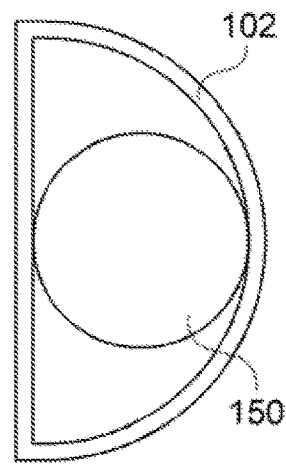
Figure 8E:
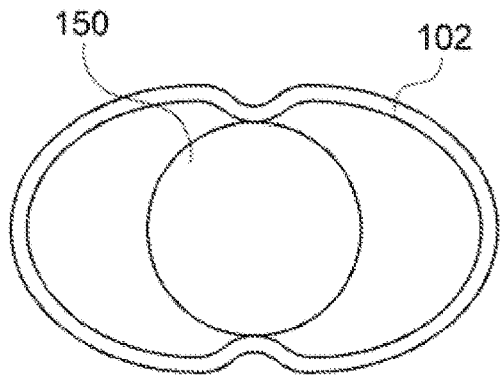

Referring to FIG. 8A, the inner surface of the accommodating compartment 102 may be formed in a non-circular (e.g., oval) shape. Referring to FIG. 8B, the inner surface of the accommodating compartment 102 may be formed in a shape of a combination of circular shapes having different radii of curvatures. Referring to FIG. 8C, the inner surface of the accommodating compartment 102 may be formed in a shape of a combination of a trapezoidal shape and a circular shape. Referring to FIG. 8D, the inner surface of the accommodating compartment 102 may be formed in a shape of a combination of a flat shape and a circular shape. Referring to FIG. 8E, the inner surface of the accommodating compartment 102 is formed in a non-circular shape by protruding inwardly so as to get in contact with the article 150.

In this way, in case where the inner surface of the accommodating compartment 102 is formed in any shape of a non-circular shape, a shape of combination of a circular shape and a non-circular shape, a shape of combination of circular shapes having different radii of curvatures, a shape of combination of a non-circular shape and a non-circular shape, a shape of combination of a circular or non-circular shape and a polygonal shape, a shape of combination of a circular or non-circular shape and a flat shape, a shape of combination of a polygonal shape and a different polygonal shape, and a polygonal shape, even if the article 150 is formed in a cylindrical shape, it is possible to achieve at least two contacts in the inner surface of the accommodating compartment 102.

Figure 9:
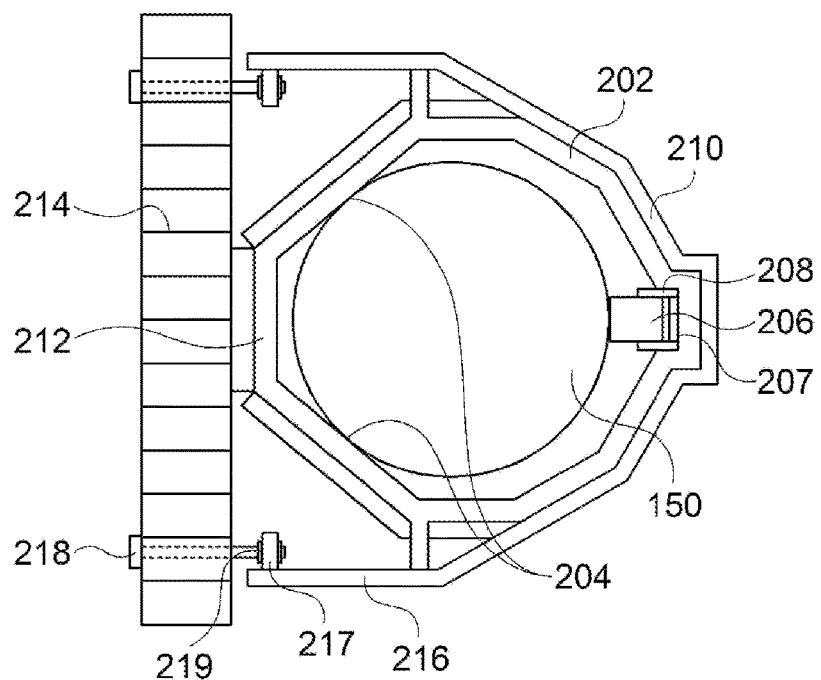
FIG. 9 is a view illustrating a storage container in accordance with a second embodiment of the present invention.

FIG. 9 is a view illustrating a storage container in accordance with a second embodiment of the present invention.

Referring to FIG. 9, a storage container 200 includes an accommodating compartment 202, a contact portion 204, a pressurizing member 206, a pressurizing member fixing portion 208, a thermoelectric element 212, a heat radiator 214, and a fixing rib 216.

The accommodating compartment 202, the contact portion 204, the pressurizing member 206, and the pressurizing member fixing portion 208 are the same as those shown in FIGS. 3 through 6, and thus the detailed description thereof will be omitted. However, the pressurizing member 206 and the pressurizing member fixing portion 208 may be formed to be placed in a pressurizing member inserting recess 207 formed at the accommodating compartment 202. With this configuration, it is possible to fix the pressurizing member 206 more stably.

A heat insulating member 210 may be formed at the outside of the accommodating compartment 202. The heat insulating member 210 serves to thermally block the accommodating compartment 202 from the outside so as for the chilly air or the hot air in the accommodating compartment 202 to be prevented from escaping to the outside. Between the heat-insulating member 210 and the accommodating compartment 202, a hot wire (not shown) may be formed. When the hot wire (not shown) is operated to supply the hot air to the accommodating compartment, the accommodating compartment 202 can be rapidly heated. The hot wire (not shown) may be operated with the thermoelectric element 212, which however is not limited thereto, and may be operated independently with respect to the thermoelectric element 212. In this description, the hot wire (not shown) is described as being formed between the heat insulating member 210 and the accommodating compartment 202, which however is not limited thereto, and the hot wire (not shown) may be either embedded in the accommodating compartment 202, or may be formed on the inner surface of accommodating compartment 202.

The thermoelectric element 212 is formed at one side of the accommodating compartment 202. The thermoelectric element 212 is the element that is capable of converting either electrical energy into thermal energy, or thermal energy into electrical energy. In this description, the thermal element 212 converts electrical energy into heat energy. Depending on the polarity of the power to be applied to the thermoelectric element 212, the accommodating compartment 202 may be cooled or heated through the thermoelectric element 212.

The heat radiator 214 is installed on the back surface of the thermoelectric element 212. The heat radiator 214 serves to dissipate the heat generated from the thermoelectric element 212 to the outside. The heat radiator 214 may be equipped with a plurality of heat radiating fins.

The fixing ribs 216 may be provided on both sides of the accommodating compartment 202, which however is not limited thereto, and the fixing rib 216 may be provided on only one side of the accommodating compartment 202. One side of the fixing rib 216 may be connected to the accommodating compartment 202, and the other side of the fixing rib 216 may be coupled with the heat radiator 214 through a coupling member 218. The other side of the fixing rib 216 is formed spaced apart from the heat radiator 214 at a predetermined interval. In the fixing rib 216, at least one elongated rib 217 may be formed. Then, the coupling member 218 may be coupled to the elongated rib 217 by passing through the heat radiator 214. Between the coupling member 218 and elongated rib 217, a heat shield member 219 may be formed. The heat shield member 219 serves to prevent the heat of the heat radiator 214 from being transferred to the accommodating compartment 202 through the fixing rib 216.

As described above, by connecting the accommodating compartment 202 and the heat radiator 214 by the fixing rib 216, it is possible to fix the heat radiator 214 in the storage container 100 through a simple configuration without any structure. Also, it is possible to thermally block the heat radiator 214 and the accommodating compartment 202 through the heat shield member 219. The fixing rib 216 may be formed in one piece with the accommodating compartment 202.

Figure 10:
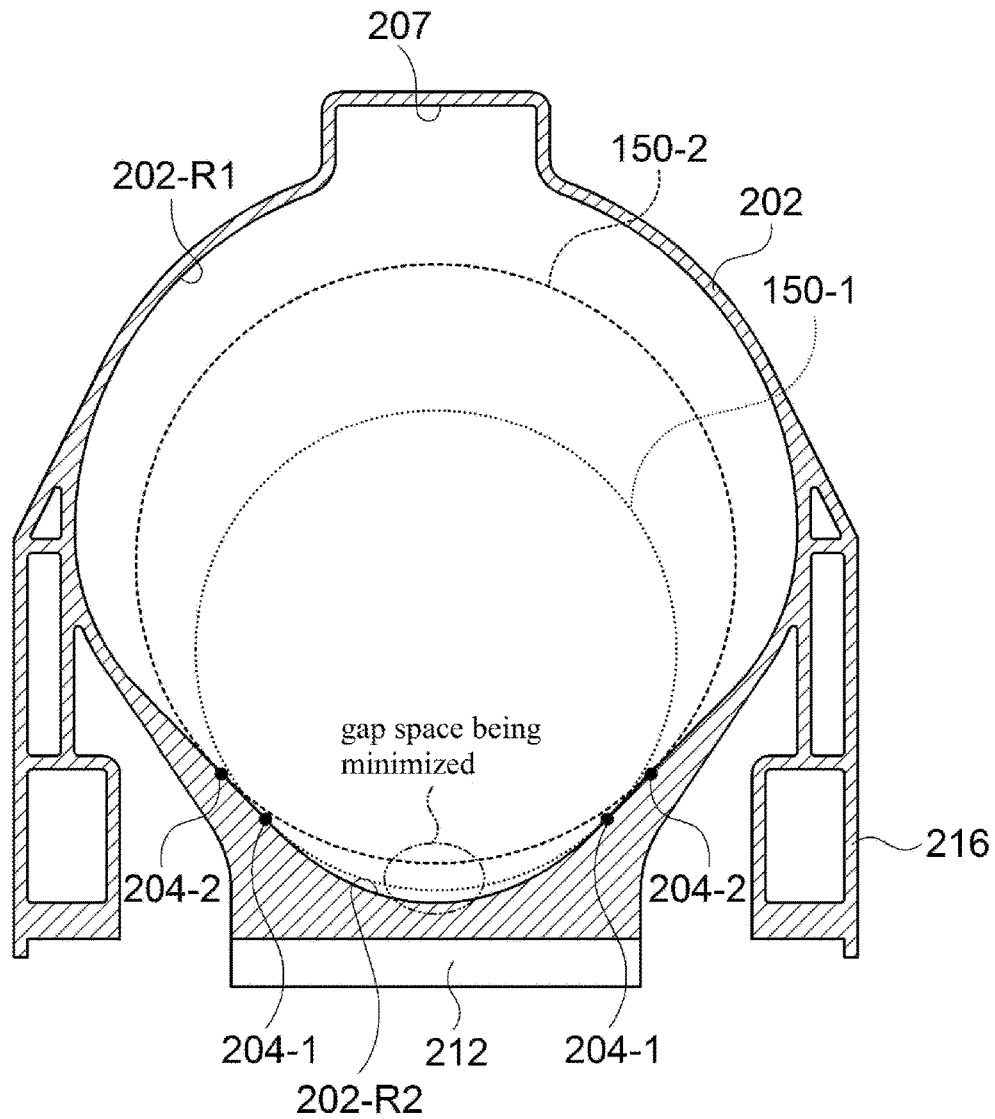
FIG. 10 is a view illustrating a storage container in accordance with a third embodiment of the present invention.

FIG. 10 is a view illustrating a storage container of a third embodiment of the present invention.

Referring to FIG. 10, the thermoelectric element 212 may be formed at one side of the accommodating compartment 202. The accommodating compartment 202 includes an area 202-R1 having a first radius of curvature R1 and an area 202-R2 having a second radius of curvature R2. Accordingly, the accommodating compartment 202 becomes a shape of a combination of two circular shapes having different radii of curvatures. The pressurizing member inserting recess 207 in which a pressurizing member (not shown) is inserted may be formed at the accommodating compartment 202.

In the area 202-R2 having the second radius of curvature R2, two first contact portions 204-1 with which a first article 150-1 having a radius of curvature larger than the second radius of curvature R2 gets in contact may be formed. In the area 202-R1 having the first radius of curvature R1, two second contact portions 204-2 with which a second article 150-2 having a radius of curvature larger than that of the first article 150-1 but smaller than that of the first radius of curvature R1 gets in contact may be formed. In this case, the first article 150-1 and the second article 150-2 may be formed in a cylindrical shape having a predetermined radius of curvature respectively.

The area 202-R1 having the first radius curvature R1 may be formed in a portion corresponding to the thermoelectric element 212. In this case, the first radius of curvature R1 and the second radius of curvature R2 may be determined so that a gap space between the first area 202-R1 having the first radius of curvature R1 and the first article 150-1 and the second article 150-2 can be minimized. Therefore, the heat loss being caused during the course of heat transfer from the accommodating compartment 202 to the first article 150-1 or the second article 150-2 can be minimized.

In FIG. 10, it is shown that each of the two first contact portions 204-1 and the second contact portions 204-2 is formed in the area 202-R1 having the first radius of curvature R1 and the area 202-R2 having the second radius of curvature R2 respectively, which however is not limited thereto, and various numbers of contact portions other than above may be formed.

Figure 11:
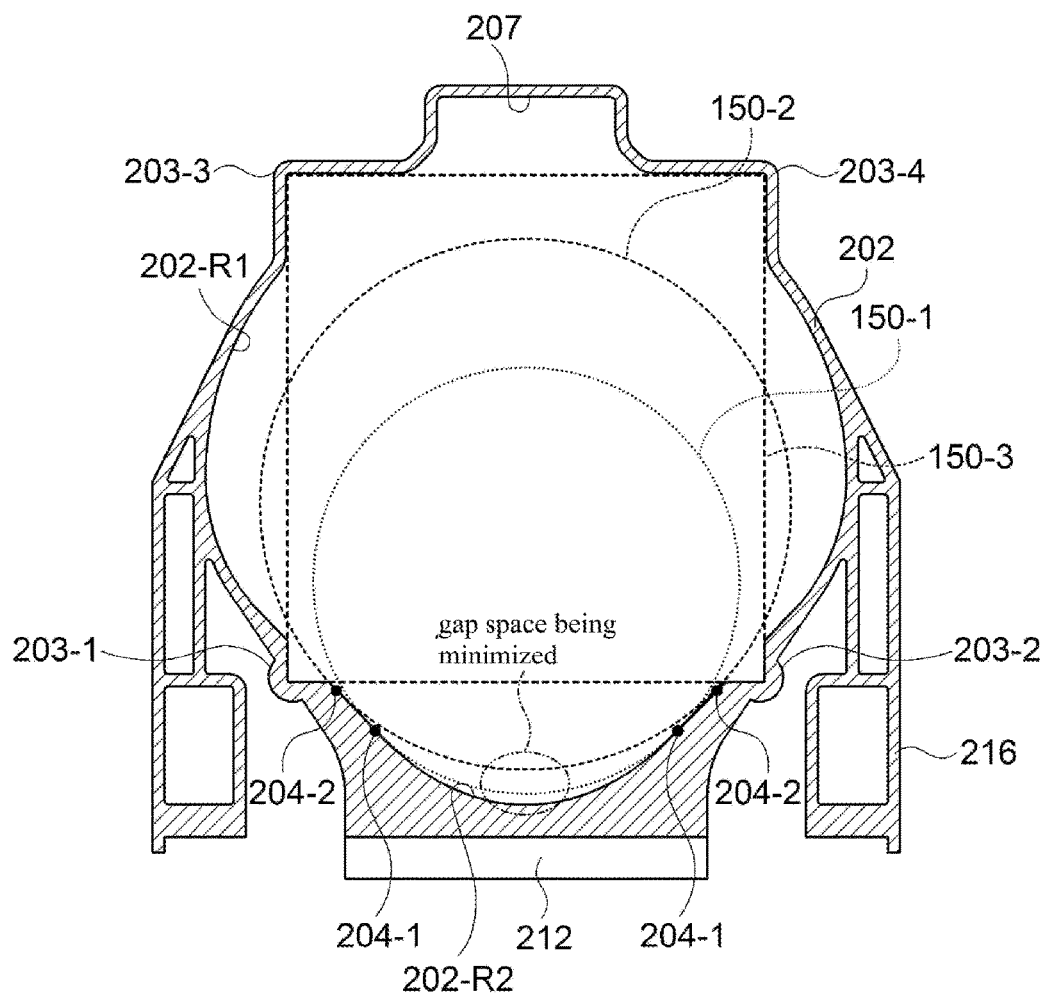
FIG. 11 is a view illustrating a storage container in accordance with a fourth embodiment of the present invention.

In addition, as shown in FIG. 11, the accommodating compartment 202 may include a corner portion 203 so as to accommodate a third article 150-3 having a rectangular shape. The corner portion 203 may include four corners 203-1, 203-2, 203-3 and 203-4. The four corners 203-1, 203-2, 203-3 and 203-4 may be formed in correspondence with each corner of the third article 150-3 of a rectangular shape. In this drawing, it is shown that the corner portion 203 includes four corners 203-1, 203-2, 203-3 and 203-4, which however is not limited thereto, and the corner portion 203 may include two or more corners. For example, the corner portion 203 may include only two corners 203-1 and 203-2, 203-1 and 203-3, 203-2 and 203-4, 203-3 and 203-4 to be formed on the same surface. Further, the corner portion 203 may include only two corners 203-1 and 203-4, 203-2 and 203-3 facing each other diagonally.

In case where the third article 150-3 having a rectangular shape is accommodated in the accommodating compartment 202, the third article 150-3 gets in contact with each of the corners 203-1, 203-2, 203-3 and 203-4 in two sides thereof, and thereby it is possible to improve the heat transfer efficiency. Meanwhile, a plurality of corner portions 203 may be formed in correspondence with the size of the third article 150-3. In other words, a plurality of corner portions 203 corresponding to the third articles 150-3 (an article of a rectangular shape) having different sizes each other may be formed at the accommodating compartment 202.

In accordance with an embodiment of the present invention, any one article of the first article 150-1 having a radius of curvature larger than the second radius of curvature R2, the second article 150-2 having a radius of curvature larger than the radius of curvature of the first article 150-1 but smaller than the first radius of curvature R1, and the third article 150-3 of a rectangular shape can be accommodated, and thereby it is possible to accommodate variously shaped and sized articles through the single accommodating compartment 202. However, the present invention is not limited thereto, and the inner surface of the accommodating compartment 202 may be formed in a circular shape (or oval shape), and the corner portion 203 may be formed so as to accommodate an article of a rectangular shape in the accommodating compartment 202. Accordingly, it is possible to accommodate beverage bottles of a circular shape or beverage bottle of a rectangular shape through the single the accommodating compartment 202.

On the other hand, the storage container in accordance with an embodiment of the present invention may be provided in vehicles. In case where the storage container is provided inside a vehicle, it is possible to cool or heat the storage container using a cooling system (e.g., an air conditioner) and a heating system (e.g., a heater) installed in the vehicle. Hereinafter, a cooling system and a heating system in a vehicle are referred as an air conditioning system of the vehicle.

Figure 12:
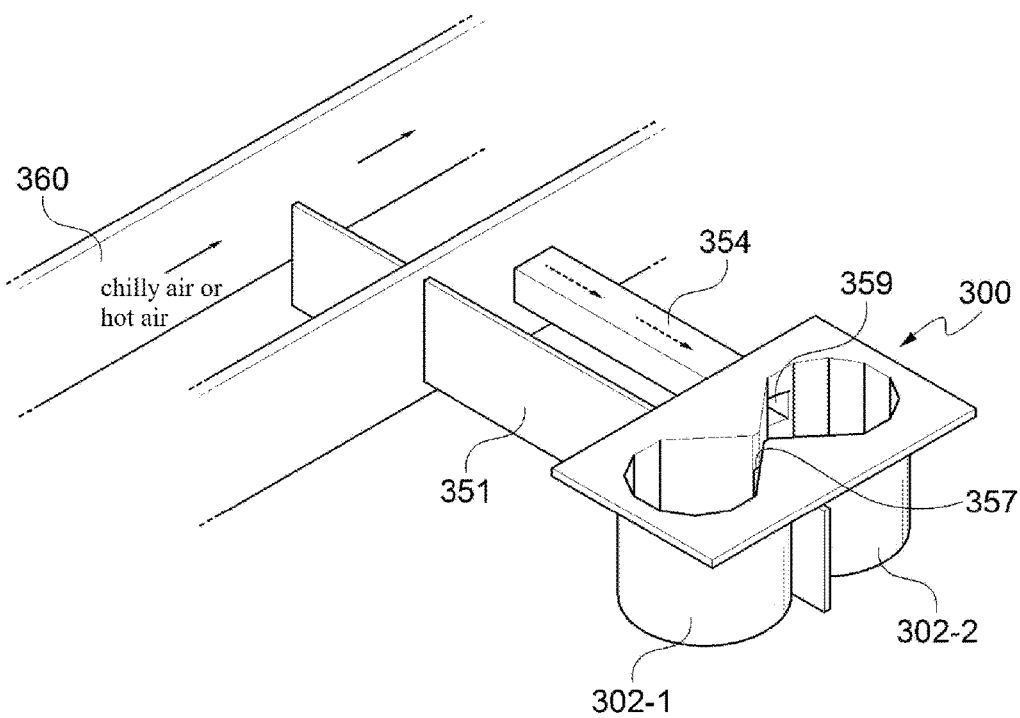
FIG. 12 is a view illustrating a storage container in accordance with a fifth embodiment of the present invention.
Figure 13:
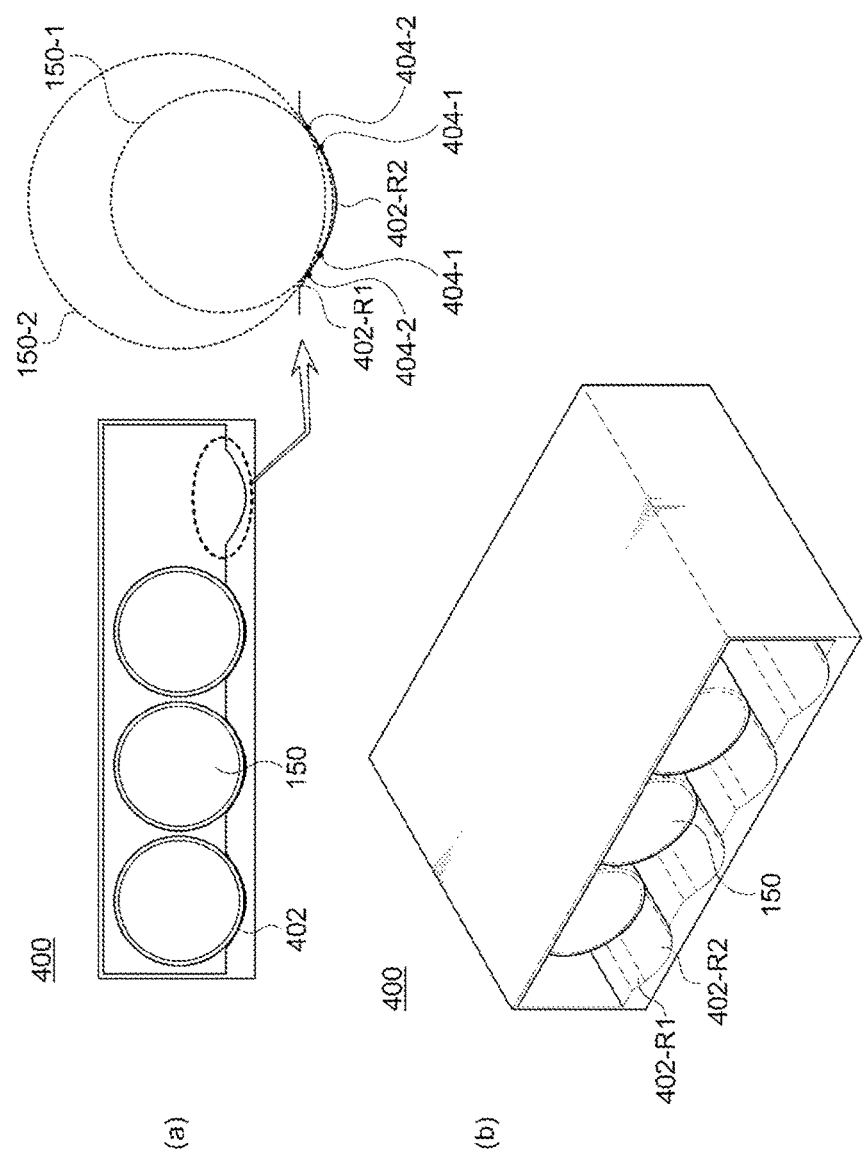
FIGS. 13A and 13B are views illustrating a storage container in accordance with a sixth embodiment of the present invention.

FIG. 12 is a view illustrating a storage container in accordance with fifth embodiment of the present invention.

Referring to FIG. 12, a storage container 300 may be connected to an air exhaust duct 360 of the air conditioning system of the vehicle via a heat pipe 351 and a duct 354. The air exhaust duct 360 is a passage through which the chilly air or the hot air exhausting from the air conditioning system of the vehicle moves. One side of the heat pipe 351 may be formed at the air exhaust duct 360, and the other side of the heat pipe 351 may be formed at the storage container 300. For example, the other side of the heat pipe 351 may be fixed by inserting within an inserting recess 357 which is formed between a first accommodating compartment 302-1 and a second accommodating compartment 302-2 of the storage container 300.

One side of the duct 354 may be connected to the inside of the air exhaust duct 360, and the other side of the duct 354 may be connected to the inside of the storage container 300. In this case, a connecting hole 359 which is connected to the other side of the duct 354 may be formed at the storage container 300. With this configuration, the chilly air or the hot air of the air exhaust duct 360 is delivered to the storage container 300 via the heat pipe 351 and the duct 354, and thereby it is possible to cool or heat the storage container 300 without a separate thermoelectric element. In the inside of the duct 354, a suction fan (not shown) may be installed for introducing the chilly air or the hot air of the air exhaust duct 360 to the duct 354.

In this embodiment, it is shown that the storage container 300 is connected to the air exhaust duct 360 via the heat pipe 351 and the duct 354, which however is not limited thereto. Alternatively, the storage container 300 may be connected to the air exhaust duct 360 via any one of the heat pipe 351 and duct 354. In addition, a part or whole of the storage container 300 may be formed at the air exhaust duct 360. In this case, the chilly air or the hot air of the air exhaust duct 360 may be introduced to the storage container 300 even without the heat pipe 351 and the duct 354.

FIGS. 13A and 13B are views illustrating a storage container in accordance with a sixth embodiment of the present invention, wherein FIG. 13A is a front view of the storage container in accordance with a sixth embodiment, and FIG. 13B is a perspective view of the storage container in accordance with a sixth embodiment.

Referring to FIGS. 13A and 13B, a storage container 400 has storage spaces of a predetermined shape therein and may be formed so as for one surface thereof (e.g., the front or top surface) to be opened. On the opened portion of the storage container 400, a cover (not shown) may be mounted. The storage container 400 may be installed, for example, in a glove box, console box, arm-rest etc. of vehicles. In other words, the storage container 400 may be implemented in a form that can be installed in the glove box, console box, arrest etc. of the vehicle other than the described shape of the cup holder.

In the storage container 400, at least one accommodating compartment 402 may be formed, which is capable of accommodating the article 150, such as a beverage can or a beverage bottle. The accommodating compartment 402 may be formed in a shape of seating recess so that the article 150 can be placed safely on one side of the storage container 400.

The accommodating compartment 402 of a shape of seating recess includes an area 402-R1 having a first radius of curvature R1 and an area 402-R2 having a second radius of curvature R2. In the area 402-R2 having the second radius of curvature R2, two first contact portions 404-1 with which the first article 150-1 having a radius of curvature larger than the second radius of curvature R2 gets in contact may be formed. Also, in the area 402-R1 having the first radius of curvature R1, two second contact portions 404-2 with which the second article 150-2 having a radius of curvature larger than that of the first article 150-1 but smaller than the first radius of curvature R1 gets in contact may be formed. In this case, the first article 150-1 and the second article 150-2 may be formed of a cylindrical shape having predetermined radius of curvature respectively. The first radius of curvature R1 and the second radius of curvature R2 may be determined so as for a gap space between the area 402-R1 having the first radius of curvature R1 and the first article 150-1 and the second article 150-2 to be minimized. In this embodiment, it is shown that the seating recess is formed of areas having the first radius of curvature R1 and the second radius of curvature R2, which however is not limited thereto, and the seating recess of the accommodating compartment 402 may be formed in any shape of a combination of two or more areas having different radii of curvatures, a shape of a combination of an area having a predetermined radius of curvature and a flat surface, or a shape of a combination of two or more different flat surfaces.

Figure 14:
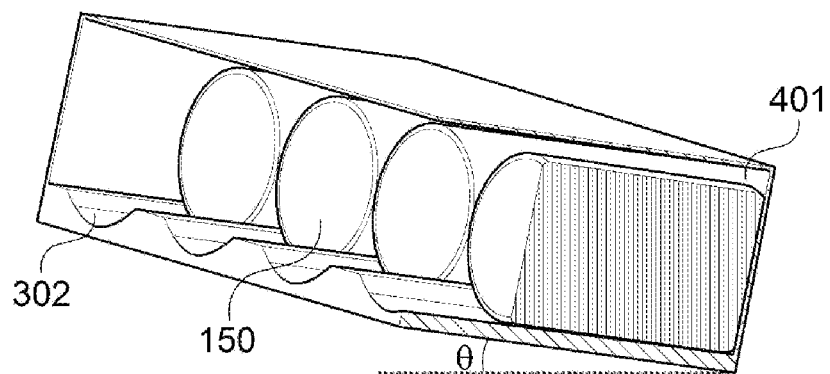
FIG. 14 is a view illustrating a storage container in accordance with a seventh embodiment of the present invention.

On the other hand, as shown in FIG. 14, a storage container 400 may be formed to be inclined at a predetermined angle. That is, the storage container 400 may be mounted at an inclined angle, when being mounted in a glove box, console box, arm-rest etc. of the vehicles. In this case, the side of the article 150 may get in contact with the accommodating compartment 402, and also the bottom surface of the article 150 may get in contact with the back side 401 of the storage container 400. In this embodiment, it is shown that the storage container 400 is formed to be inclined at a predetermined angle so as for the bottom surface of the article 150 to get in contact with the back side 401 of the storage container 400, which however, is not limited thereto, and a pressurizing member (not shown) may be formed at the front of the article 150 so as for the bottom surface of the article 150 to be pressurized to get in contact with the back side 401 of the storage container 400.

Figure 15:
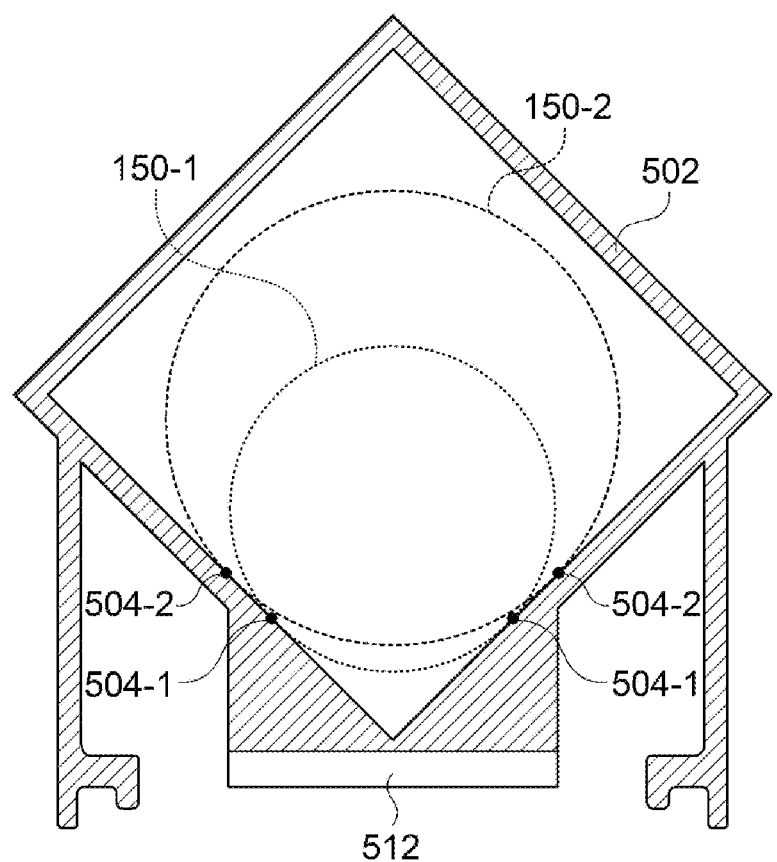
FIG. 15 is a view illustrating a storage container in accordance with an eighth embodiment of the present invention.

FIG. 15 is a view illustrating a storage container in accordance with an eighth embodiment of the present invention.

Referring FIG. 15, an accommodating compartment 502 of a storage container 500 may be formed in a rectangular shape (e.g., a square shape, rectangular shape, rhombic shape, trapezoidal shape, or the like). In this case, the accommodating compartment 502 has two contact portions 504. For example, in case where the first article 150-1 having a small diameter is accommodated by one corner portion of the accommodating compartment 502, the first article 150-1 gets in contact with the accommodating compartment 502 at two contact portions 504-1. Also, in case where the second article 150-2 having a large diameter is accommodated by one corner portion of the accommodating compartment 502, the second article 150-2 gets in contact with the accommodating compartment 502 at two contact portions 504-2. In the corner which is opposite to one corner of the accommodating compartment 502, a pressurizing member (not shown) may be formed to pressurize the article 150 to the direction of one corner of the accommodating compartment 502. In this configuration, two sides of the accommodating compartment 502 forming one corner of the accommodating compartment 502 may be formed to be inclined by applying the take-out gradient, and the bottom surface of the accommodating compartment 502 may be formed to be inclined by applying the take-out gradient so as to be perpendicular to the two sides of the accommodating compartment 502. Since either the first article 150-1 or the second article 150-2 gets in contact with the bottom surface of the accommodating compartment 502, there are provided three contact points. On one side of the storage container 500, a thermoelectric element 512 may be mounted.

The present invention is described herein in detail through a typical embodiment, but it is to be understood by those skilled in the art that the described embodiment may be modified variously without departing from the scope of the present invention. Therefore, the scope of right of the present invention is not limited to the described embodiment and is defined by claims and equivalents.

[LEGEND OF REFERENCE NUMERALS]

| | |
|---|---|
| 100, 200, 300, 400, and 500: storage container | |
| 102, 202, 302, 402, 502: accommodating compartment | |
| 102-1: first accommodating compartment | |
| 102-2: second accommodating compartment | |
| 102-a: bottom surface | 104, 204: contact portion |
| 106, 206: pressurizing member | 108, 208: pressurizing member fixing portion |
| 110: container support member | 150: article |
| 203: corner portion | 207: pressurizing member inserting recess |
| 210: heat insulating member | 212: thermoelectric element |
| 214: heat radiator | 216: fixing rib |
| 217: elongated rib | 218: coupling member |
| 219: heat shield member | |
| 351: heat pipe | 354: duct |
| 357: inserting recess | 359: connecting hole |
| 360: air exhaust duct | |

The invention claimed is:

1. A storage container, comprising:
   an accommodating compartment, the accommodating compartment including an inner surface that is formed in any one of a non-circular shape, a combination of a circular shape and a non-circular shape, a combination of circular shapes having different radii of curvatures, a combination of a non-circular shape and a non-circular shape, a combination of a circular shape or a non-circular shape and a polygonal shape, a combination of a circular shape or a non-circular shape and a flat shape, a combination of a polygonal shape and a different polygonal shape, and a polygonal shape;
   a contact portion formed at the inner surface of the accommodating compartment and getting in contact with a side of an article to make a heat transfer to the article;
   a thermoelectric element of which one side is formed at the accommodating compartment;

a heat radiator which is formed at the other side of the thermoelectric element;
a fixing rib of which one side is connected to the accommodating compartment;
a coupling member which couples the heat radiator and the other side of the fixing rib to each other; and
a heat shield member which is formed at the coupling member and blocks thermally the heat radiator and the fixing rib,
wherein a bottom surface of the accommodating compartment is formed to make a right angle with respect to the contact portion; and
wherein the contact portion is formed to be inclined by applying a take-out gradient, and the bottom surface of the accommodating compartment is connected to a bottom of the contact portion, is formed to be inclined by an angle of the take-out gradient, and makes a right angle with respect to the contact portion.

2. The storage container of claim 1, further comprising:
a pressurizing member which makes the other side of the article pressurized in the inner surface of the accommodating compartment so as for the article to get in a close contact with the inner surface of the accommodating compartment; and
a pressurizing member inserting recess which is formed at the accommodating compartment, the pressurizing member inserting recess including the pressurizing member housed and fixed therein.

3. The storage container of claim 1, further comprising:
at least one thermal conductive protrusion which is formed on the outer surface or the inner surface of the accommodating compartment.

4. The storage container of claim 1, wherein at least either the contact portion or the bottom surface of the accommodating compartment is made of a first thermal conductive material, and a portion other than the contact portion and the bottom surface of the accommodating compartment is made of a material having a thermal conductivity less than the first thermal conductive material.

5. The storage container of claim 1, further comprising:
a secondary heat transfer member which is formed at the contact portion.

6. The storage container of claim 1, wherein the storage container is formed by coupling a side of the accommodating compartment and the bottom surface of the accommodating compartment to each other and has a leak-proof member that is formed between the side and the bottom surface of the accommodating compartment.

7. The storage container of claim 1, further comprising:
a hot wire which is formed at the accommodating compartment.

8. The storage container of claim 1, wherein the storage container is installed in a vehicle having an air conditioning system, the storage container receiving a chilly air or a hot air from the air conditioning system of the vehicle via a duct or a heat pipe connected to the air conditioning system of the vehicle.

* * * * *